US011675964B2

(12) United States Patent
Hinchliffe et al.

(10) Patent No.: US 11,675,964 B2
(45) Date of Patent: Jun. 13, 2023

(54) MANAGEMENT OF REMOTE ACCESS USER APPLICATION LAYOUTS

(71) Applicant: Citrix Systems, Inc., Fort Lauderdale, FL (US)

(72) Inventors: Craig Alan Hinchliffe, Lower Stondon (GB); Henry John Ashman, Cambridge (GB)

(*) Notice: Subject to any disclaimer, the term of this patent is extended or adjusted under 35 U.S.C. 154(b) by 117 days.

(21) Appl. No.: 17/171,605

(22) Filed: Feb. 9, 2021

(65) Prior Publication Data
US 2021/0165948 A1 Jun. 3, 2021

Related U.S. Application Data

(62) Division of application No. 16/156,458, filed on Oct. 10, 2018, now Pat. No. 10,963,621.

(51) Int. Cl.
*G06F 40/103* (2020.01)
*G06F 40/106* (2020.01)
*G06F 3/0481* (2022.01)
*H04L 67/306* (2022.01)

(52) U.S. Cl.
CPC .......... *G06F 40/106* (2020.01); *G06F 3/0481* (2013.01); *G06F 40/103* (2020.01); *H04L 67/306* (2013.01)

(58) Field of Classification Search
CPC .. G06F 21/6245; G06F 40/103; G06F 40/106; G06F 3/0481
See application file for complete search history.

(56) References Cited

U.S. PATENT DOCUMENTS

| 8,646,032 B2* | 2/2014 | Aad | G06F 21/6245 |
| | | | 709/224 |
| 8,811,951 B1* | 8/2014 | Faaborg | H04L 51/224 |
| | | | 455/418 |
| 9,081,746 B1 | 7/2015 | Helter | |
| 10,788,958 B2 | 9/2020 | Karthikeyan et al. | |
| 2002/0059621 A1 | 5/2002 | Thomas et al. | |
| 2004/0167989 A1 | 8/2004 | Kline et al. | |
| 2004/0193910 A1* | 9/2004 | Moles | G06F 21/84 |
| | | | 713/193 |
| 2005/0097438 A1* | 5/2005 | Jacobson | G06F 40/186 |
| | | | 715/202 |

(Continued)

OTHER PUBLICATIONS

Jun. 1, 2020—(US) Non-final Office Action—U.S. Appl. No. 16/156,458.

(Continued)

*Primary Examiner* — Dino Kujundzic

(57) ABSTRACT

Methods and systems for modifying display of applications displayed on local computing devices are described herein. A local computing device may request, from a remote application server, one or more remote applications. The local computing device, user of the remote computing device, and/or the one or more applications may be associated with layout preferences. The layout preferences may be based on a location of the local computing device, a device type and/or device properties of the local computing device, or other similar context information. Display of the one or more remote applications may be modified based on the layout preferences. A user may alter display of the one or more remote applications, and the layout preferences may be modified.

20 Claims, 6 Drawing Sheets

(56) References Cited

U.S. PATENT DOCUMENTS

| | | | |
|---|---|---|---|
| 2006/0031762 A1* | 2/2006 | Takashima | G06F 40/186 |
| | | | 715/255 |
| 2006/0288280 A1* | 12/2006 | Makela | G06F 40/131 |
| | | | 715/251 |
| 2007/0005607 A1 | 1/2007 | Fukuta et al. | |
| 2007/0174410 A1 | 7/2007 | Croft et al. | |
| 2007/0198656 A1 | 8/2007 | Mazzaferri et al. | |
| 2008/0082911 A1* | 4/2008 | Sorotokin | G06F 16/9577 |
| | | | 715/236 |
| 2010/0275266 A1* | 10/2010 | Jakobson | G09G 5/00 |
| | | | 726/26 |
| 2013/0031470 A1* | 1/2013 | Daly, Jr. | G06F 40/103 |
| | | | 715/243 |
| 2013/0212487 A1* | 8/2013 | Cote | H04N 21/41407 |
| | | | 715/745 |
| 2014/0006346 A1 | 1/2014 | Davis et al. | |
| 2014/0033029 A1* | 1/2014 | Pittenger | G06F 40/169 |
| | | | 715/271 |
| 2014/0082745 A1* | 3/2014 | Guedalia | G06F 3/0481 |
| | | | 726/27 |
| 2014/0304326 A1 | 10/2014 | Wesley et al. | |
| 2014/0359602 A1 | 12/2014 | Sawaya et al. | |
| 2016/0179317 A1 | 6/2016 | Karthikeyan et al. | |
| 2016/0335581 A1* | 11/2016 | Jones | G06F 21/6245 |
| 2017/0374130 A1 | 12/2017 | AbiEzzi et al. | |
| 2019/0080112 A1* | 3/2019 | Adams | G06F 21/32 |

OTHER PUBLICATIONS

Dec. 7, 2020—(US) Final Office Action—U.S. Appl. No. 16/156,458.
Feb. 3, 2021—(US) Notice of Allowance—U.S. Appl. No. 16/156,458.

\* cited by examiner

MANAGEMENT OF REMOTE ACCESS USER APPLICATION LAYOUTS

CROSS-REFERENCE TO RELATED APPLICATION(S)

This application is a division of U.S. patent application Ser. No. 16/156,458 filed Oct. 10, 2018, titled Management of Remote Access User Application Layouts. That application is herein incorporated by reference for all purposes.

FIELD

Aspects described herein generally relate to remote-access systems and computer applications, user applications, display processing, and operator and/or user interfaces.

BACKGROUND

A user of a local computing device may access and use remote applications as if they were stored and executed on their local computing device. For example, rather than maintain a copy of a word processing application and a spreadsheet application on a local computing device, the user may remotely retrieve such applications from a remote server. This remote access may not only be more secure, but may allow complex computational tasks to be performed by remote servers, rather than a potentially weaker local computing device.

A user may use a wide variety of local computing devices in a wide variety of contexts to access such remote applications. For example, a user may draft a presentation using a remote presentation application and later make quick edits to the presentation via a different instance of the remote presentation application using their smartphone. The local computing devices may vary in terms of location, computational power, display properties, operating system, and the like. Because remote applications are centralized, remote applications may not account for such variance in local computing devices. For example, the remote application may display using the same user interface on both a laptop and a smartphone, though using certain elements of the user interface may be difficult to do on a touch interface of the smartphone.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards displaying remote applications based on layout preferences associated with a user, local computing device, and/or the same or different applications. A server may receive, from a local computing device such as a laptop, a request for one or more remote applications, such as a word processing application hosted by the server. The request may include authentication information, information about the location of the user and/or the local computing device, information about the local computing device (e.g., a device type and/or device properties, such as display resolution), and the like. The user, local computing device, and/or one or more applications may be associated with layout preferences. For example, the user may always prefer that applications open in a full-screen mode, or users of laptops such as the requesting laptop may prefer that applications open in a window on the left side of a display. The layout preferences may be a history of layout preferences, e.g., for the same or different applications. The layout preferences may be based on a location of the local computing device, a device type of the local computing device, and/or device properties of the local computing device, such as a count of displays connected to the local computing device. The remote application may be displayed based on the layout preferences. For example, a request for a remote application may indicate that the local computing device is a workstation with two displays, the layout preferences may indicate that the user of the local computing device prefers applications such as the remote application on the second of the two displays, and the server may cause the remote application to be displayed on the second of the two displays. The layout preferences may be changed based on modification, by the user, to the display of the remote application (e.g., by changing the shape of a window of the remote application).

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed remote applications at local computing devices. Remote applications may be stored on one or more servers and accessed by a plurality of different local computing devices, such as laptops, desktops, smartphones, and the like. For example, the remote applications may be transmitted by a server as a video stream to a local computing device, and the local computing device may transmit input commands to the server.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
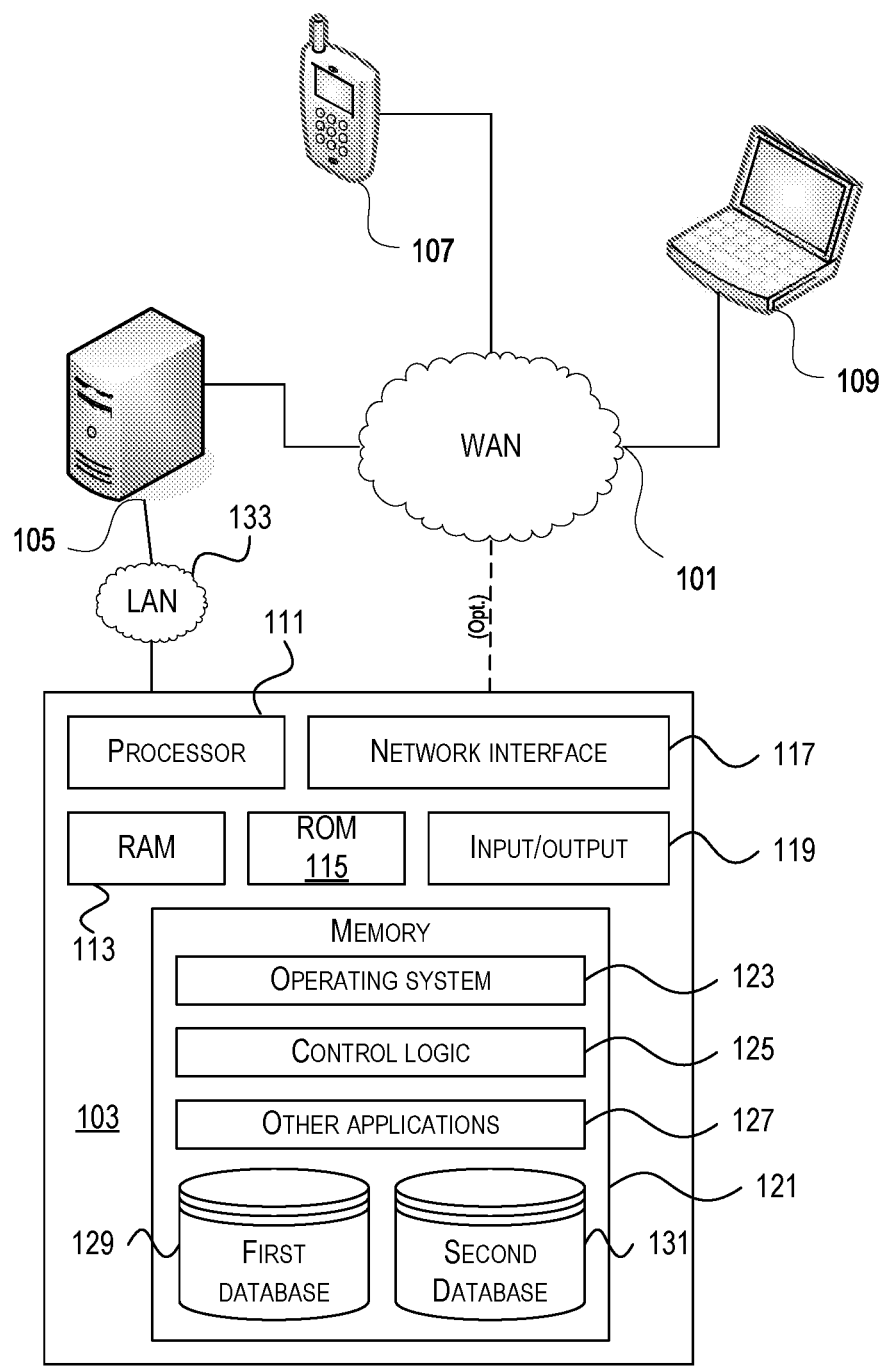
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
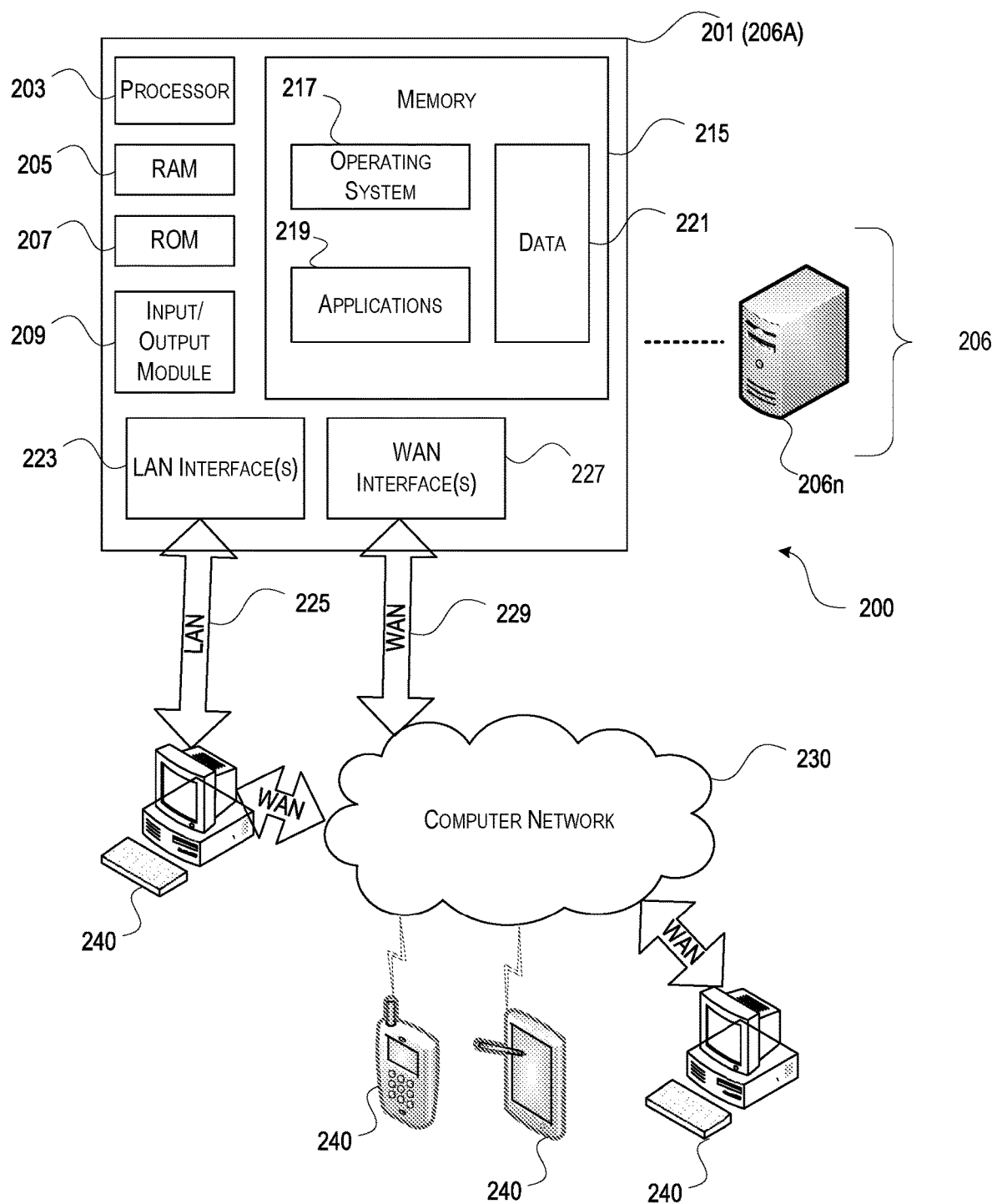
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet).

It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: local computing device(s), client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
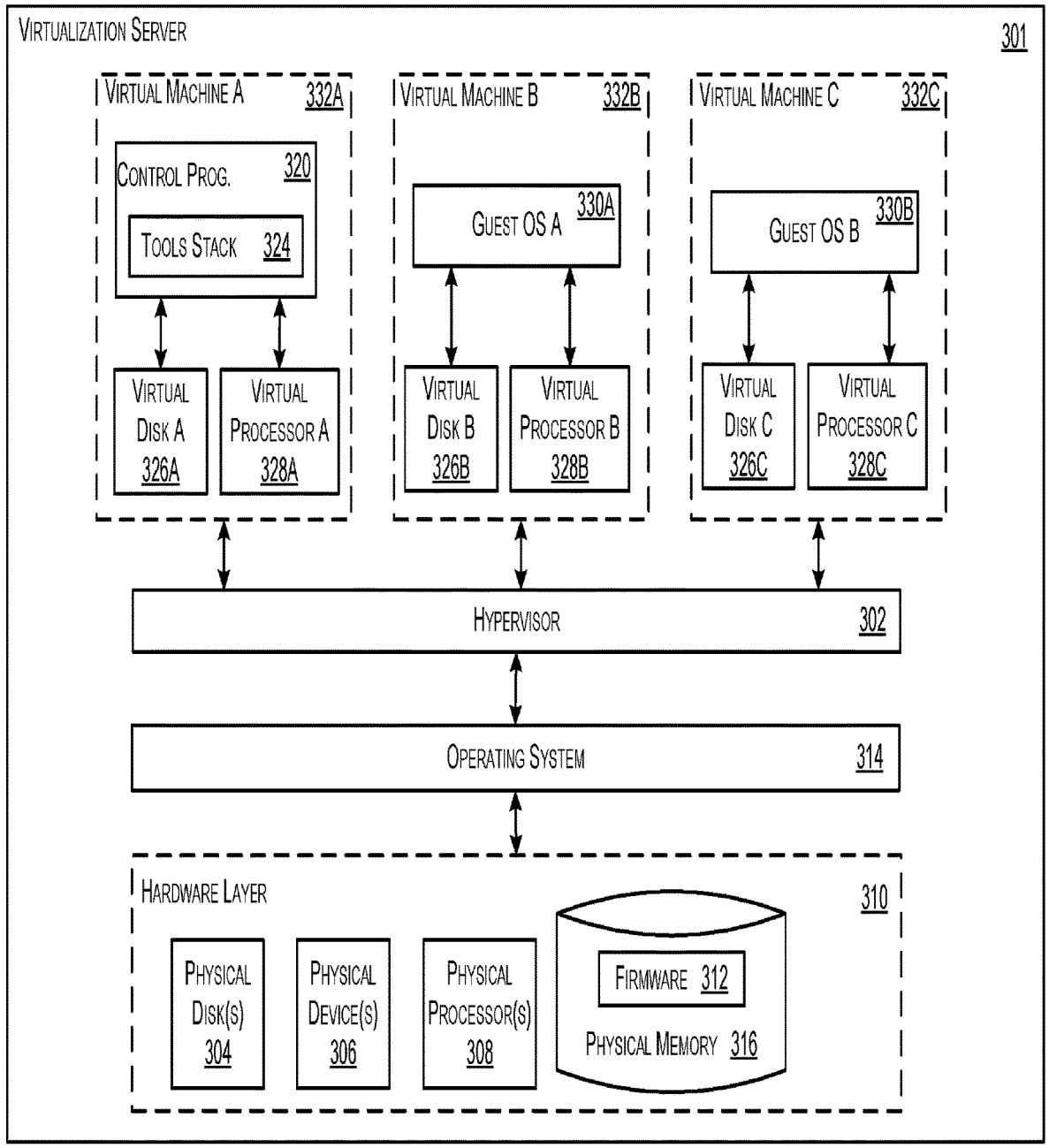
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Layout Management

Figure 4:
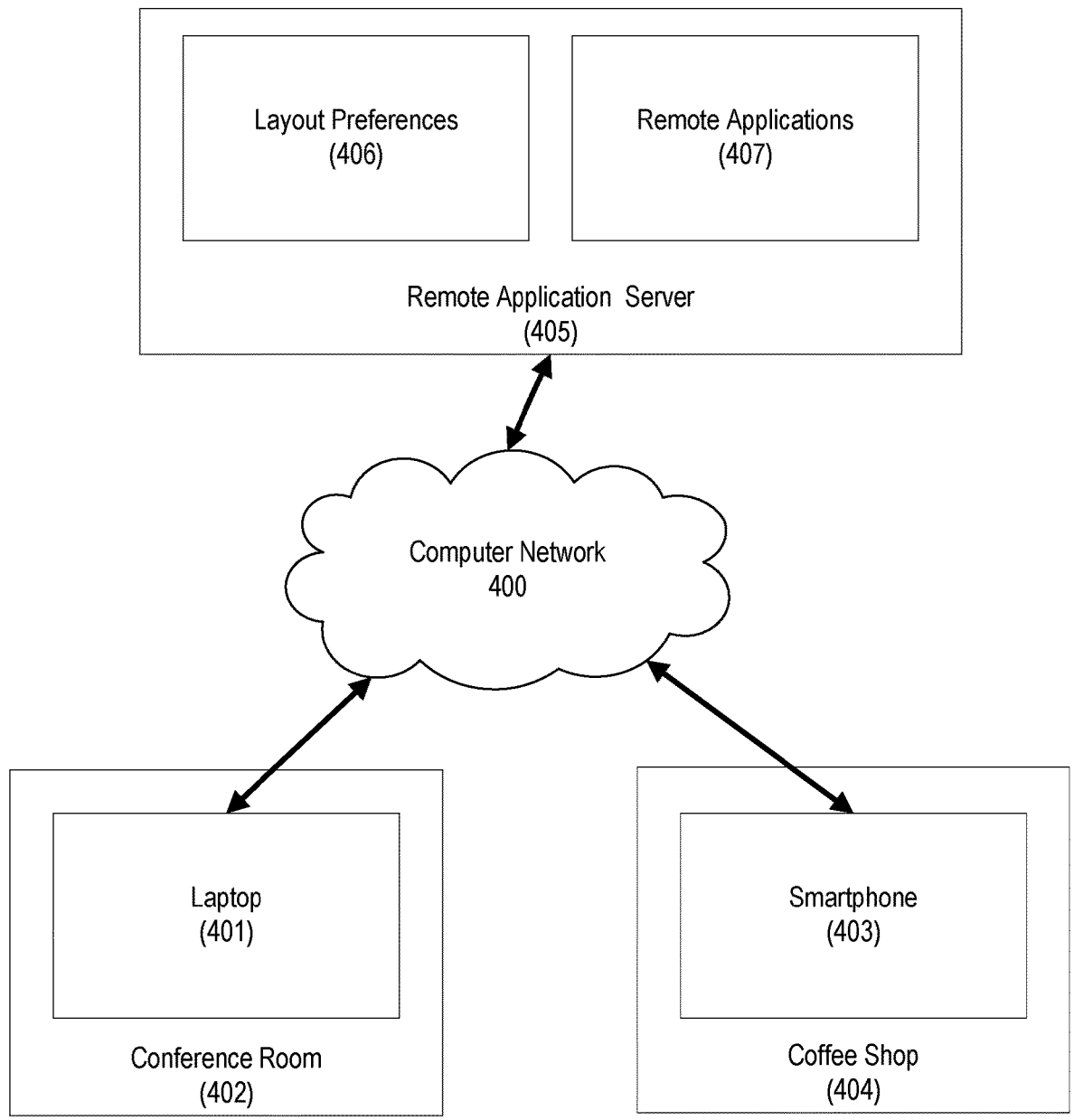
FIG. 4 depicts an illustrative network with a remote application server.

FIG. 4 shows a network with two local computing devices located in different locations. A computer network 400 connects the two local computing devices. The computer network 400 may be the same or a similar network as the computer network 230. A laptop 401, which may be the same or similar to the terminals 240 (or other client devices), may be located in a conference room 402. A smartphone 403, which may also be the same or similar to the terminals 240 (or other client devices), may be located in a coffee shop 404. Both the laptop 401 and the smartphone 403 may be connected, via the computer network 400, to a remote application server 405. The remote application server 405 may be the same or similar to the server 206 and/or the virtualization server 301. The remote application server may store layout preferences 406 and remote applications 407. Though the layout preferences 406 and the remote applications 407 are depicted as stored on the remote application server 405, the layout preferences 406 and/or the remote applications 407 may be stored on different computing devices (e.g., on the computer network 400) and accessible by the remote application server 405.

The remote application server 405 may be one or more computing devices configured to provide remote applications (e.g., the remote applications 407) to local computing devices such as the laptop 401 and the smartphone 403. Providing an application may comprise transmitting, to the local computing devices, images and/or a video stream corresponding to output of the remote application. Additionally or alternatively, applications may be provided in a package, e.g., as executable files, to one or more computing devices, which may be configured to execute the application. Applications, such as the remote applications 407, may additionally or alternatively be provided as part of a virtual machine, such as the virtual machines 332A-C. For example, a user of the laptop 401 may remotely access a virtual desktop environment as part of the virtual machine 332A, then cause an application (e.g., a word processing application) to execute in the virtual desktop environment.

Local computing devices, such as the laptop 401 and the smartphone 403, may be of a different device type and have different device properties. For example, the laptop 401 may be associated with a device type indicating that it is a laptop, with device properties indicating, e.g., display resolution, storage space, a quantity of memory, processor speed, graphics processing capabilities, or the like. As another example, the smartphone 403 may be associated with a device type indicating that it is a smartphone, with device properties indicating its display size, processing capabilities, network status (e.g., whether it is on the Internet via a cellular network), network limitations (e.g., data transmission limits), and the like. A local computing device may be connected to one or more displays, such as multiple computer monitors, and the display properties may comprise information corresponding to each display (e.g., a resolution, position relative to other monitors, orientation). The local computing devices may be configured to report such device type and device properties information to the remote application server 405.

Local computing devices, such as the laptop 401 and the smartphone 403, may be located in different locations. For example, as shown in FIG. 4, the laptop 401 is in the conference room 402, whereas the smartphone 403 is located in the coffee shop 404. Different locations may have different connections to the computer network 400 such that, for example, the conference room 402 may have a relatively fast and secure wired connection to the computer network 400, whereas the coffee shop 404 may have a relatively slow and insecure wireless connection to the computer network 400. Different locations may be associated with different levels of security and/or trust such that the remote application server 405 may not transmit certain databased on the levels of security and/or trust. For example, the remote application server 405 may be managed by a company and the conference room 402 may be in the company's headquarters, such that the conference room 402 may be trusted by the remote application server 405, whereas the coffee shop 404 may be untrusted by the remote application server 405.

The layout preferences 406 may be any information corresponding to the display of an application, such as the remote applications 407. A layout preference may correspond to window geometry information of an application, such as whether an remote application is displayed in a window or as a full-screen application, the size of a window of the remote application, the particular size of various elements of the remote application, what information is displayed by the remote application, and the like. Layout preferences may be associated with one or more applications (e.g., such that a word processing application is always displayed full-screen), one or more users (e.g., a particular group of users always want a remote spreadsheet application in a window located on the top of a desktop), and/or one or more local computing devices (e.g., that applications displayed on a smartphone should always be displayed using a large-format user interface, such that buttons may be more easily pressed using a touchscreen). Layout preferences may comprise a history of layout preferences, e.g., for the same or different remote applications. For example, a particular user may always configure applications to be displayed on the left half of their display, and such a preference may be stored and associated with the user. Layout preferences may be associated with one or more users, one or more applications (whether a local application stored on a local computing device or a remote application), and/or one or more local computing devices. For example, layout preferences may be specified for all spreadsheet applications run on desktop computers when used by a particular department in a company. Layout preferences may be relative to default layout preferences for a local computing device and/or an application. For example, an application may have default layout preferences causing it to be displayed in a full-screen mode, but layout preferences for a user may specify that these default layout preferences should be ignored and the application should be displayed in a window with a particular window geometry. Layout preferences may be relative to one or more layout preferences rules. For example, layout preferences may specify that a user prefers all applications be displayed in a window, but such layout preferences may be overruled if a layout preference rule specific to a particular remote application specifies that the particular remote application must be displayed in a full-screen mode at all times. Layout preferences may be based on a group associated with a remote application requested. For example, layout preferences for a group of remote applications used by a first part of a company may be different than layout preferences for the same group of remote applications used by a different part of the same company.

Figure 5:
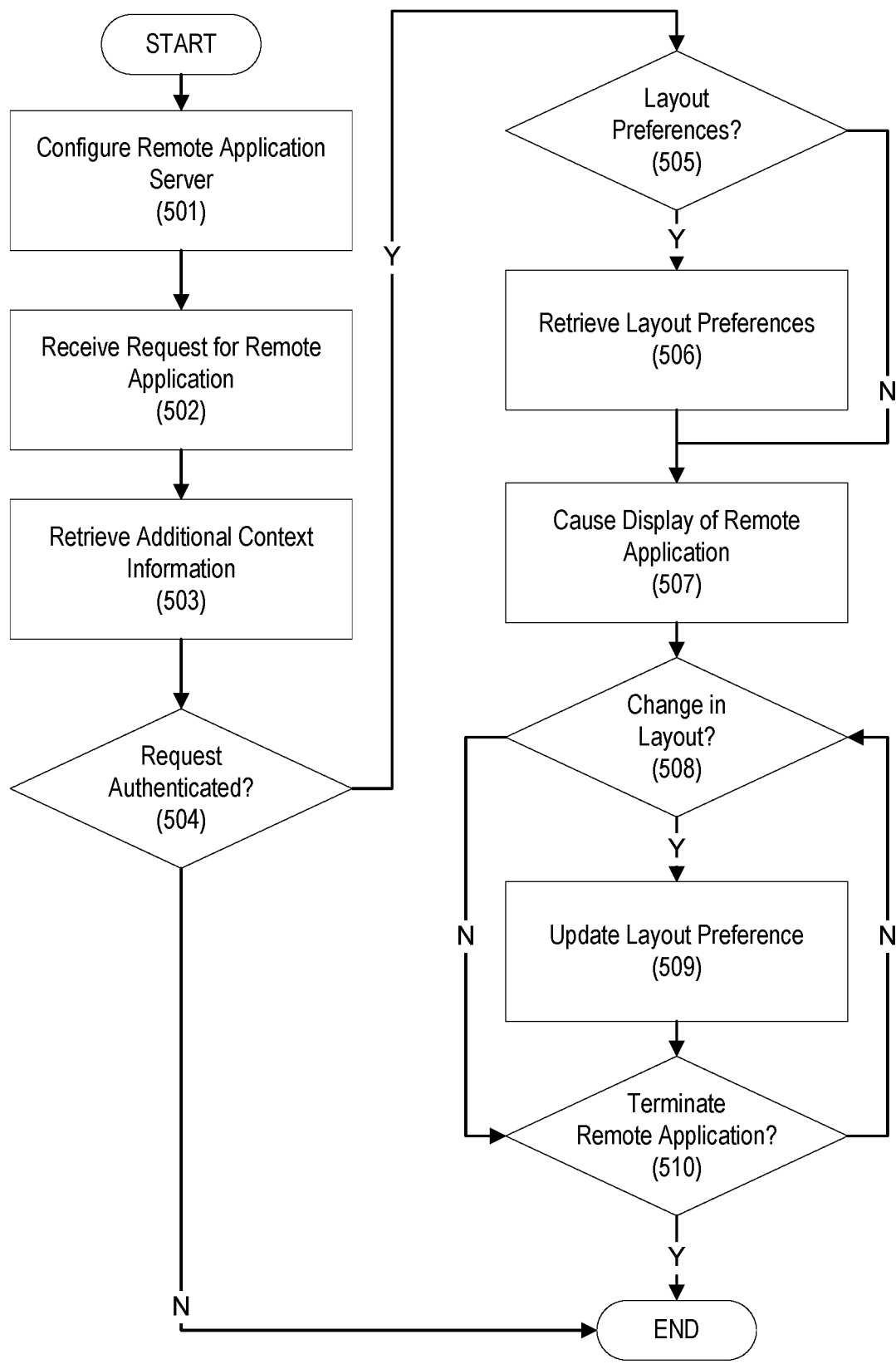
FIG. 5 is a flow chart which may be performed by the remote application server.

FIG. 5 is a flow chart which may be performed by the remote application server. In step 501, the remote application server may be configured. The remote application server may be configured with one or more remote applications (e.g., the remote applications 407) which may be executed by one or more local computing devices. The remote application server may be configured with indications of geographic locations (e.g., the conference room 402 and/or the coffee shop 404) which are trusted or untrusted. The remote application server may determine one or more default layout preferences for one or more applications. For example, a remote application may, by default, start as a full-screen application, rather than in a window. The remote application server may determine one or more layout preferences rules. For example, the remote application server may determine that any display with a display resolution smaller than 1920×1080 must display a particular application as a full-screen application, whereas a display with a display resolution equaling or larger than 1920×1080 may display the particular application in a window.

In step 502, a request for a remote application may be received. The request may be received from a local computing device, such as the laptop 401 or the smartphone 403. The request may comprise an indication of a particular remote application, such that the remote application server may select a remote application from a plurality of available remote applications. Though the request shown in FIG. 5 is for a single remote application, the local computing device may request multiple remote applications. For example, a local computing device may request both a spreadsheet application and a word processing application, and the flow chart depicted in FIG. 5 may repeat for each remote application.

The request may comprise authentication information associated with a user of the local computing device. For example, the request may comprise a username and password associated with the user of the local computing device transmitting the request. The authentication data may be for a particular remote application. For example, the remote application requested may be a banking application, and the authentication information may correspond to the user's particular bank account.

The request may comprise a device type and/or device properties corresponding to the local computing device. For example, the request may comprise an indication that the local computing device is a tablet with a touchscreen having a 1920×1080 display resolution but no other input devices. As another example, the request may comprise an indication of a make and model of the local computing device (e.g., a particular smartphone model). As yet another example, the request may comprise network status information (e.g., bandwidth, latency, uptime) corresponding to a network (e.g., the computer network 400) via which the local computing device may receive the remote application.

The remote application requested may be part of a group of remote applications. For example, a group of remote applications may exist for financial transactions, whereas a different group of remote applications may exist for programming work. The request may identify the group of remote applications and thereby request all remote applications in the group.

The request may comprise context information associated with the local computing device, such as a location of the local computing device. Context information may include a bandwidth of the local computing device, a location of the computing device, and/or other operational information associated with the user or local computing device. For example, the request may comprise GPS coordinates, an IP address, and/or a street address of the local computing device. The location of a local computing device may be determined via, for example, a global positioning system (GPS) (e.g., a GPS device inside of the smartphone 403), network information (e.g., an IP address), or the like.

The request need not create a new instance of the remote application, but may merely access an existing instance of the remote application. A user may establish a session with the remote application server 405 on a first local computing device (e.g., the laptop 401) and later access the same session on a second local computing device (e.g., the smartphone 403). The remote application request may be a request based on this connection to the existing session.

In step 503, additional context information associated with the local computing device that transmitted the request may be determined. Additional device properties may be determined by requesting and receiving device properties from the local computing device. For example, the request received in step 502 may comprise an indication of the make and model of a local computing device, and, using this information, device properties may be retrieved from a database (e.g., a database of display resolutions for each make and model of smartphone). Additionally or alternatively, the device properties may be determined based on checking information in the request (e.g., a session identifier, a username, or the like) with a database of known devices. For example, a username may be associated with a particular laptop, the request may comprise the username, and device properties of the particular laptop may be retrieved from the database of known devices.

Determining additional context information associated with the local computing device may additionally or alternatively comprise determining a location of the local computing device. For example, the request received in step 502 may comprise an IP address, and, using the IP address, an Internet Service Provider (ISP) and location of the local computing device may be determined. As another example, the request received in step 502 may comprise GPS coordinates, and, using those GPS coordinates, an approximate street address of the local computing device may be determined.

In step 504, the request may be authenticated. The request may be authenticated based on authentication data associated with the request, such as a username and password. The request may be authenticated based on one or more sessions (e.g., virtual machine sessions) associated with the requesting local computing device. Authentication may comprise comparing authentication data (e.g., as received from a local computing device) with stored information associated with a user. Authentication may additionally or alternatively comprise determining that the device that transmitted the request is permitted to access the remote application. For example, one user may be allowed to use their smartphone to access a remote application, but a different user may only be allowed to use a laptop to access the same remote application. If the request is authenticated, the flow chart may proceed to step 505. Otherwise, the flow chart may end.

In step 505, it is determined whether one or more layout preferences (e.g., the layout preferences 406) are available. Checking whether one or more layout preferences are available may comprise checking a database using a query comprising an indication of the requesting local computing device (e.g., a device type or device properties of the local computing device), information about the user, an indication of the remote application requested, or the like. If the layout preference is available, the flow chart proceeds to step 506. Otherwise, the flow chart proceeds to step 507.

In step 506, the layout preference(s) may be retrieved. If multiple layout preferences exist, only a portion of the layout preferences may be retrieved based on the request. Layout preferences corresponding to a user, a particular application, and/or a particular local computing device may be retrieved. For example, if the request is transmitted via a smartphone, only layout preferences corresponding to smartphones may be retrieved. As another example, all layout preferences corresponding to a particular user may be retrieved, even if the layout preferences do not necessarily correspond to the requested remote application and/or the local computing device used by the user to transmit the request.

In step 507, the remote application may be displayed on the local computing device. The remote application may be displayed as part of a virtual machine (e.g., in a virtual desktop environment associated with virtual machines 332A-C), in a window on a desktop environment on the local computing device (e.g., as executed as part of an executable file downloaded from the remote application server 405), or the like. For example, the remote application server 405 may transmit a video stream to the laptop 401 corresponding to the remote application requested, and the laptop 401 may transmit input commands back to the remote application server 405. As part of the transmission of the video stream, the remote application server 405 may transmit instructions to the laptop 401 relating to how and/or where the video stream should be displayed (e.g., on a particular monitor, in a particular window on a desktop environment of the laptop, or the like).

The remote application may be displayed based on the layout preferences. Examples of how the layout preferences may be displayed based on the layout preferences are provided below.

The layout preferences may affect the window geometry of the displayed remote application. An application, such as the requested remote application, may correspond to one or more windows. The windows may be part of a virtual desktop environment or part of a desktop environment of the local computing device. For example, the local computing device may display a remote application in a window in a desktop environment, the window in the desktop environment may display a video stream of multiple windows in a virtual desktop environment, and the window geometry may correspond to the window in the desktop environment and/or the windows in the virtual desktop environment. The size, shape, orientation, and layout of all or portions of the window(s) may be based on the layout preferences. For example, if a user customarily turns off a portion of an application associated with tooltips, then the layout preferences may specify that the portion is to remain turned off. As another example, the layout preferences may specify a size of a menu portion of a window of an application. As yet another example, the layout preferences may specify a particular location of each of a plurality of windows of an application.

The layout preferences may affect the layout of multiple windows, including one or more windows associated with an application. For example, a virtual desktop may display two windows, one corresponding to the requested remote application, and the layout preferences may specify that the window corresponding to the requested remote application be displayed to the left of the other window. As another example, if a remote application is associated with two windows displayed on a desktop environment of a local computing device, the layout preferences may store a relative location of the two windows.

The layout preferences may affect an operational status and/or mode of an application. For example, layout preferences may specify that, in a conference room, a presentation application should default to a presentation mode, whereas in an office the same application should default to an editing mode. As another example, the layout preferences may specify that, when a financial application is opened anywhere but a trusted location, currency values are obscured.

The layout preferences need not be associated with the remote application requested. For example, a user may customarily display all applications in a full-screen mode such that, when the same user requests a new remote application that they have never used before, the layout preferences for that user may suggest that the remote application be displayed in a full-screen mode.

New layout preferences may be determined based on existing layout preferences, such as a history of layout preferences for different users, different local computing devices, and/or different applications. New layout preferences may be determined based on a comparison of a device type and/or device properties of two local computing devices. For example, layout preferences for a remote application may exist for laptops with displays that have a display resolution of 1920×1080, but not for displays that have a display resolution of 1280×720. In that example, new layout preferences for the display with the display resolution of 1280×720 may be determined by multiplying layout preferences for the display resolution of 1920×1080 by two-thirds. New layout preferences may be determined based on a comparison of users. For example, if no layout preferences exist for a particular user, new layout preferences may be determined based on existing layout preferences for similar users (e.g., the user's coworkers). New layout preferences may be determined based on a comparison of applications. For example, new layout preferences may be determined based on a comparison of a first remote application associated with layout preferences and a second remote application not associated with layout preferences. As a more particularized example, if a user always opens applications in a window on a second monitor of a workstation, then a new remote application opened by the user on the workstation may default to being shown in a window on a second monitor.

The layout preferences may be based on the location of the local computing device and/or the user. Layout preferences for a trusted location may be different than layout preferences for an untrusted location. For example, layout preferences for a trusted conference room may indicate that sensitive financial information may be shown, but layout preferences for an untrusted coffee shop may indicate that sensitive financial information should be obscured. Layout preferences for two locations may be based on the intended use of the remote application. For example, layout preferences for a conference room may cause a presentation application to open in a presentation mode, whereas layout preferences for an office may cause the same presentation application to open in an editing mode.

If multiple layout preferences are available, one or more layout preferences may be selected from the multiple layout preferences. Most commonly used layout preferences may be selected over relatively unused layout preferences. More recent layout preferences may be selected over older layout preferences. Context information may also be used to determine which layout preferences, of the multiple layout preferences, should be selected. For example, layout preferences used in a conference room may be selected if the local computing device is determined to be in a conference room, even though newer, more frequently-used layout preferences may be available.

In step 508, a change in a layout of the remote application may be detected. The user may resize all or portions of a window corresponding to the remote application and/or may make other similar changes to the display of the remote application. The user may move the window to one or more portions of one or more displays, such as dragging a window from a first monitor to a second monitor. The user may explicitly provide an indication of a requested layout change, such as transmitting an instruction (e.g., via a menu associated with a remote application) that a remote application should be displayed with enlarged fonts. For example, a user may drag windows corresponding to various remote applications to specific locations on a display and send an instruction to the remote application server to save layout preferences for all various remote applications. Using those saved layout preferences, the user may be able to open a group of remote applications and have the remote applications appear in the same location on a different local computing device. If a change is detected, the flow chart proceeds to step 509. Otherwise, the flow chart continues to step 510.

In step 509, the layout preferences may be updated based on the change in layout detected in step 508. One or more layout preferences may be deleted, edited, or added. The layout preferences need not be changed if the change in layout detected in step 508 is temporary. As such, layout preferences may be changed if the change in layout is maintained for a predetermined period of time. For example, layout preferences may suggest that a user prefers that a remote application be displayed on a second monitor, but the user may briefly move the window to a first monitor. If the window is returned to the second monitor within a predetermined period of time (e.g., after less than a minute has elapsed), the layout preferences may not be updated.

The change in layout preferences described in steps 508 and 509 may be performed by a user browsing a listing of preexisting layout preferences. Layout preferences for different applications, local computing devices, and/or users may be listed. A user may select one or more of the layout preferences and adopt such layout preferences as their own. Based on this selection, new layout preferences for the user may be generated based on the selected layout preferences.

In step 510, it is determined whether the remote application should be terminated. For example, the user may close the remote application as displayed on the local computing device, and/or a time period may expire. If the remote application should be terminated, the flow chart ends. Otherwise, the flow chart returns to step 508.

Figure 6:
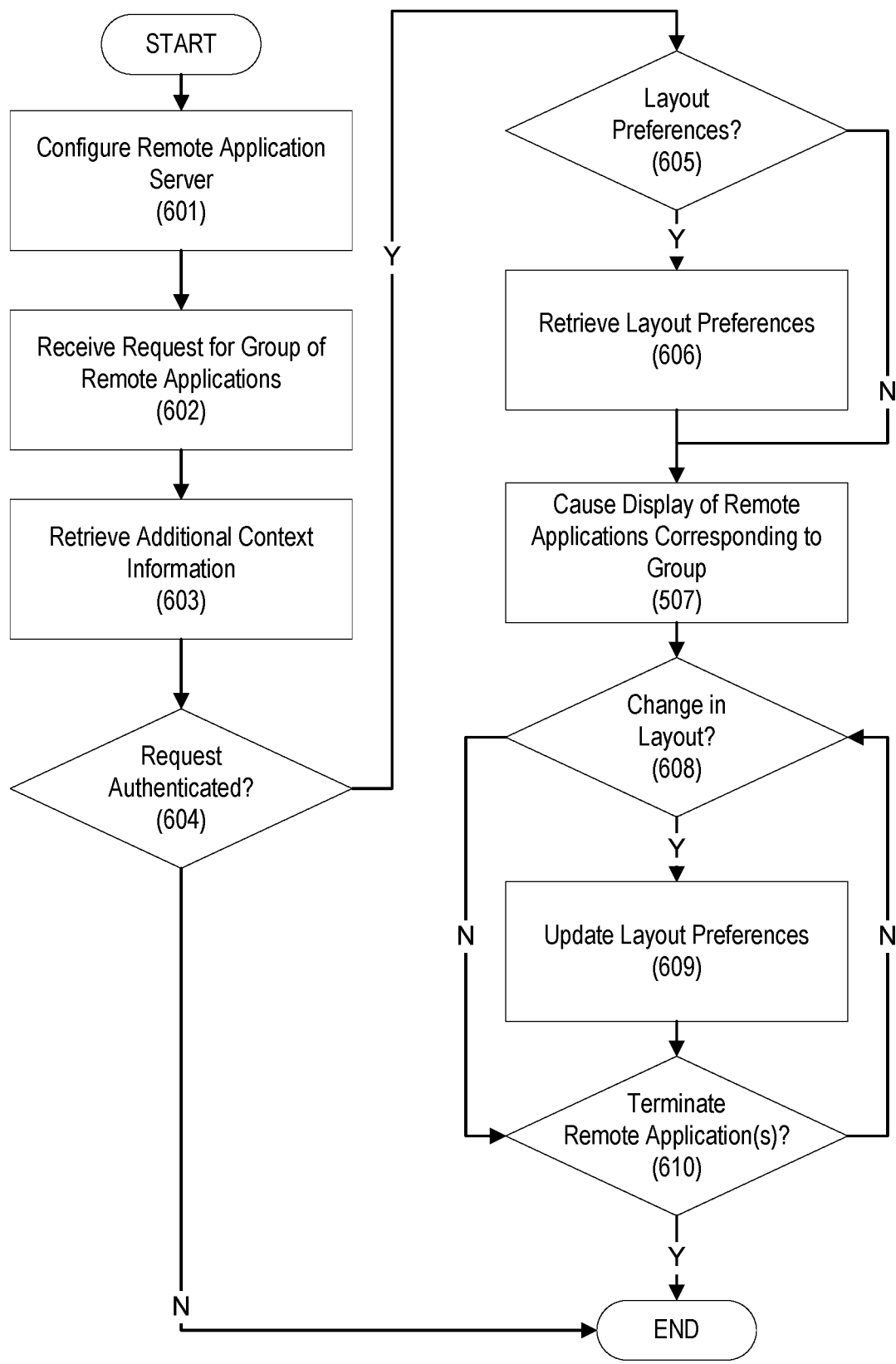
FIG. 6 is a flow chart involving a request for multiple remote applications.

FIG. 6 is a flow chart similar to FIG. 5, but now involving the request of a group of remote applications. For example, step 601 is substantially the same as step 501. A user may request a group of remote applications rather than a single application. Such groups may be referred to as collections of applications. For example, a programmer may typically require a remote coding application, a remote chatting application, and a remote web browser application. The programmer may collect all three into a group (e.g., a collection of remote applications for programming) and select the group to launch all three programs.

Step 602 is similar to step 502, except that multiple remote applications have been requested as a group. The request may comprise an indication of all remote applications or an indication of the group, using which the server may look up remote applications belonging to the group.

Step 603 and 604 are similar to steps 503 and 504, respectively. Steps 605, 606, and 607 are similar to steps 505, 506, and 507, respectively, except that multiple applications are displayed, and multiple layout preferences may be used. The layout preferences may specify window geometry information for each remote application individually as well as preferences relating to the remote applications relative to another. For example, a user might prefer that a remote web browser application be on a first display, whereas the same user might prefer that a remote application appear on a second display. As another example, the user might prefer that a remote chat application be minimized when the group of remote applications is launched in a conference room on a laptop, but that the same remote chat application be visible when the group is launched in the user's office using the user's workstation.

Steps 608, 609, and 610 are similar to steps 508, 509, and 510, respectively, except that changes to an individual remote application's layout preferences may have ramifications for multiple remote applications. For example, if a user changes a layout of a first remote application to be in a full-screen mode at all times, then other remote applications' layout preferences may be modified to indicate that the user prefers they appear behind the first remote application and/or on a different display.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
storing, by a server, a plurality of different layout preferences for an application hosted by the server, wherein a first layout preference of the plurality of different layout preferences is stored based on determining that a modification to a layout of an instance of the application was maintained for a period of time;
receiving, by the server and from a client device, a request to execute the application;
selecting the first layout preference of the plurality of different layout preferences, wherein the first layout preference indicates that one or more portions of the sensitive information should be obscured; and
causing, by the server, display via one or more displays in communication with the client device of a second instance of the application in a window to obscure the one or more portions of the sensitive information based on the selected first layout preference.

2. The method of claim 1, further comprising:
receiving an indication of a location of the client device, wherein selecting the first layout preference for the application is further based on the location.

3. The method of claim 1, further comprising:
receiving an indication of a device type of the client device, wherein selecting the first layout preference for the application is further based on the device type.

4. The method of claim 1, wherein the first layout preference further comprises an indication of a preferred location of the window, and wherein the window is displayed on a portion of the one or more displays corresponding to the preferred location.

5. The method of claim 1, wherein the application is associated with a collection of applications, and wherein selecting the first layout preference is based on the collection of applications.

6. The method of claim 1, wherein selecting the first layout preference is further based on a count of the one or more displays.

7. The method of claim 1, further comprising:
modifying, based on determining that a user of the application has changed a shape of the window, the first layout preference.

8. One or more non-transitory computer-readable media storing instructions that, when executed, cause:
storing, by a server, a plurality of different layout preferences for an application hosted by the server, wherein a first layout preference of the plurality of different layout preferences is stored based on determining that a modification to a layout of an instance of the application was maintained for a period of time;
receiving, by the server and from a client device, a request to execute the application;
selecting the first layout preference of the plurality of different layout preferences, wherein the first layout preference indicates that one or more portions of the sensitive information should be obscured; and
causing, by the server, display via one or more displays in communication with the client device of a second instance of the application in a window to obscure the one or more portions of the sensitive information based on the selected first layout preference.

9. The computer-readable media of claim 8, wherein the instructions, when executed, further cause:
receiving an indication of a location of the client device, wherein selecting the first layout preference for the application is further based on the location.

10. The computer-readable media of claim 8, wherein the instructions, when executed, further cause:
receiving an indication of a device type of the client device, wherein selecting the first layout preference for the application is further based on the device type.

11. The computer-readable media of claim 8, wherein the first layout preference further comprises an indication of a preferred location of the window, and wherein the window is displayed on a portion of the one or more displays corresponding to the preferred location.

12. The computer-readable media of claim 8, wherein the application is associated with a collection of applications, and wherein selecting the first layout preference is based on the collection of applications.

13. The computer-readable media of claim 8, wherein selecting the first layout preference is further based on a count of the one or more displays.

14. A server comprising:
one or more processors; and
memory storing instructions that, when executed by the one or more processors, cause the server to:
store a plurality of different layout preferences for an application hosted by the server, wherein a first layout preference of the plurality of different layout preferences is stored based on determining that a modification to a layout of an instance of the application was maintained for a period of time;
receive, from a client device, a request to execute the application;
select the first layout preference of the plurality of different layout preferences, wherein the first layout preference indicates that one or more portions of the sensitive information should be obscured; and
cause display via one or more displays in communication with the client device of a second instance of the application in a window to obscure the one or more portions of the sensitive information based on the selected first layout preference.

15. The server of claim 14, wherein the instructions, when executed by the one or more processors, cause the server to:
receive an indication of a location of the client device, wherein the instructions, when executed by the one or more processors, cause the server to select the first layout preference for the application further based on the location.

16. The server of claim 14, wherein the instructions, when executed by the one or more processors, cause the server to:
receive an indication of a device type of the client device, wherein the instructions, when executed by the one or more processors, cause the server to select the first layout preference for the application is based on the device type.

17. The server of claim 14, wherein the first layout preference further comprises an indication of a preferred location of the window, and wherein the window is displayed on a portion of the one or more displays corresponding to the preferred location.

18. The server of claim 14, wherein the application is associated with a collection of applications, and wherein the instructions, when executed by the one or more processors, cause the server to select the first layout preference based on the collection of applications.

19. The server of claim 14, wherein the instructions, when executed by the one or more processors, cause the server to select the first layout preference further based on a count of the one or more displays.

20. The server of claim 14, wherein the instructions, when executed by the one or more processors, cause the server to:
modify, based on determining that a user of the application has changed a shape of the window, the first layout preference.

* * * * *